(12) United States Patent
Rezaei et al.

(10) Patent No.: US 12,328,205 B2
(45) Date of Patent: Jun. 10, 2025

(54) METHOD FOR PROVIDING AT LEAST ONE ESTIMATED PARAMETER OF A WIRELESS COMMUNICATION CHANNEL AND RADIO RECEIVER DEVICE

(71) Applicant: u-blox AG, Thalwil (CH)

(72) Inventors: Farshid Rezaei, Malmö (SE); Matthias Mahlig, Berlin (DE); Peter Karlsson, Malmö (SE); Stelios Papaharalabos, Maroussi (GR); Timon Merk, Berlin (DE)

(73) Assignee: u-blox AG, Thalwil (CH)

( * ) Notice: Subject to any disclaimer, the term of this patent is extended or adjusted under 35 U.S.C. 154(b) by 17 days.

(21) Appl. No.: 18/322,756

(22) Filed: May 24, 2023

(65) Prior Publication Data

US 2023/0388153 A1 Nov. 30, 2023

(30) Foreign Application Priority Data

May 25, 2022 (EP) .................................... 22175406

(51) Int. Cl.
*H04L 25/02* (2006.01)
(52) U.S. Cl.
CPC ........ *H04L 25/021* (2013.01); *H04L 25/0224* (2013.01); *H04L 25/0254* (2013.01)
(58) Field of Classification Search
None
See application file for complete search history.

(56) References Cited

U.S. PATENT DOCUMENTS

| | | | | |
|---|---|---|---|---|
| 8,170,815 B2* | 5/2012 | Bevan | ................ | G01S 5/02521 |
| | | | | 702/57 |
| 8,265,011 B2* | 9/2012 | Sugar | ................ | G01S 5/02213 |
| | | | | 455/456.2 |

(Continued)

FOREIGN PATENT DOCUMENTS

| | | | | |
|---|---|---|---|---|
| CN | 110392387 B | * | 5/2021 | ............ H04W 24/08 |
| CN | 115480209 A | * | 12/2022 | ........... G01S 5/0205 |

(Continued)

OTHER PUBLICATIONS

K. Taunk, S. De, S. Verma and A. Swetapadma, "A Brief Review of Nearest Neighbor Algorithm for Learning and Classification," 2019 International Conference on Intelligent Computing and Control Systems (ICCS), Madurai, India, 2019, pp. 1255-1260, (Year: 2019).*

(Continued)

*Primary Examiner* — Berhanu Tadese
(74) *Attorney, Agent, or Firm* — Fish & Richardson P.C.

(57) ABSTRACT

The present disclosure relates to processes, devices, and computer program products for estimating parameters of a wireless communication channel using machine learning, and includes receiving at least one sample of raw data via the wireless communication channel, processing the at least one sample using a machine learning inference algorithm to obtain a first estimated value, processing the at least one sample using a signal processing algorithm to obtain a second estimated value, acquiring a first confidence value for the first estimated value, acquiring a second confidence value for the second estimated value, evaluating the first confidence value and the second confidence value, and providing either the first estimated value or the second estimated value or a combination of the first and the second (Continued)

estimated value as the at least one estimated parameter based on the evaluation.

12 Claims, 3 Drawing Sheets

(56) References Cited

U.S. PATENT DOCUMENTS

| | | | | |
|---|---|---|---|---|
| 9,014,172 | B2* | 4/2015 | Sugar | G01S 5/06 |
| | | | | 370/512 |
| 9,551,775 | B2* | 1/2017 | Rangarajan | G01S 5/0226 |
| 11,140,651 | B2* | 10/2021 | Ayyalasomayajula | |
| | | | | H04L 25/0216 |
| 12,015,452 | B2* | 6/2024 | Marshall | G01S 5/0236 |
| 2009/0204390 | A1* | 8/2009 | Yamamoto | G10L 15/065 |
| | | | | 704/251 |
| 2010/0311436 | A1* | 12/2010 | Bevan | G01S 5/02521 |
| | | | | 455/456.1 |
| 2012/0120834 | A1* | 5/2012 | Sugar | G01S 5/0218 |
| | | | | 370/252 |
| 2012/0320787 | A1* | 12/2012 | Sugar | G01S 5/021 |
| | | | | 370/252 |
| 2013/0065537 | A1* | 3/2013 | Yepez | H04L 25/0224 |
| | | | | 455/67.11 |
| 2016/0069978 | A1* | 3/2016 | Rangarajan | G01S 5/0226 |
| | | | | 455/456.1 |
| 2020/0213971 | A1* | 7/2020 | Ayyalasomayajula | |
| | | | | H04W 4/029 |
| 2020/0396710 | A1* | 12/2020 | Wigren | H04W 24/10 |
| 2023/0176167 | A1* | 6/2023 | Kalogiros | G01S 5/021 |
| | | | | 455/456.1 |
| 2023/0388153 | A1* | 11/2023 | Rezaei | H04L 25/021 |
| 2024/0104434 | A1* | 3/2024 | Lenzarini | G06N 20/00 |
| 2024/0192305 | A1* | 6/2024 | Mahlig | G01S 3/46 |
| 2024/0201308 | A1* | 6/2024 | Rezaei | G01S 5/0036 |
| 2024/0210571 | A1* | 6/2024 | Somieski | G01C 21/165 |
| 2024/0230919 | A1* | 7/2024 | Biason | G01S 19/46 |
| 2024/0255976 | A1* | 8/2024 | Anagnostopoulos | G05F 3/262 |
| 2024/0259991 | A1* | 8/2024 | Lenzarini | H04L 63/107 |

FOREIGN PATENT DOCUMENTS

| | | | | |
|---|---|---|---|---|
| CN | 117135670 A | * | 11/2023 | G01S 3/02 |
| CN | 117744794 A | * | 3/2024 | G06N 20/00 |
| CN | 117805868 A | * | 4/2024 | G01S 19/03 |
| CN | 112970233 B | * | 6/2024 | G01S 1/0428 |
| CN | 118209925 A | * | 6/2024 | G01S 3/023 |
| CN | 118317421 A | * | 7/2024 | G01S 1/042 |
| EP | 2549812 B1 | * | 11/2014 | G01S 5/0252 |
| EP | 4283933 A1 | * | 11/2023 | G01S 3/02 |
| EP | 4128827 B1 | * | 1/2024 | H04B 7/0639 |
| EP | 4343644 A1 | * | 3/2024 | G06N 20/00 |
| EP | 4345482 A1 | * | 4/2024 | G01S 19/03 |
| EP | 4191271 B1 | * | 5/2024 | G01S 5/011 |
| WO | WO-9014172 A | * | 11/1990 | D01D 5/11 |
| WO | WO-2012100240 A2 | * | 7/2012 | G01S 11/02 |
| WO | WO-2019135105 A1 | * | 7/2019 | G01S 3/16 |

OTHER PUBLICATIONS

Babakhani et al: "Bluetooth Direction Finding using Recurrent Neural Network," 2021 International Conference on Indoor Positioning and Indoor Navigation (IPIN), IEEE, Nov. 2021, 7 pages.

Extended Search Report in European Appln. No. 22175406.2, dated Nov. 25, 2022, 8 pages.

Khan et al., "Angle-of-Arrival Estimation Using an Adaptive Machine Learning Framework," IEEE Communications Letters, Feb. 2019, 23(2):294-297.

Taunk et al., "A Brief Review of Nearest Neighbor Algorithm for Learning and Classification," 2019 International Conference on Intelligent Computing and Control Systems (ICCS), May 15-17, 2019, 1255-1260.

* cited by examiner

METHOD FOR PROVIDING AT LEAST ONE ESTIMATED PARAMETER OF A WIRELESS COMMUNICATION CHANNEL AND RADIO RECEIVER DEVICE

CROSS-REFERENCE TO RELATED APPLICATIONS

This application claims priority to European Application No. 22175406.2, filed on May 25, 2022, the contents of which are incorporated herein by reference in their entirety.

TECHNICAL FIELD

The present disclosure relates to the field of wireless communications, especially to the estimation of characteristics of signals occurring in a wireless communication channel. Specifically, the disclosure is directed to a method for providing at least one estimated parameter of a wireless communication channel, a radio receiver device, a computer program product and a computer readable medium.

BACKGROUND

In the transmission of radio frequency, RF, signals, on the receiver side RF signals are evaluated and relevant characteristics are estimated in order to properly detect the RF signals and decode data transmitted using these signals. In this context, parameters of a wireless communication channel, which is used for the transmission of RF signals, are estimated.

Known solutions employ signal processing algorithms for estimating parameters of a wireless communication channel. For example, channel state information, CSI, or an angle-of-arrival, AoA, may be estimated using signal processing algorithms like Multiple Signal classification, MUSIC, Propagator Direct Data Acquisition, PDDA, or Estimation of Signal Parameters via Rotational Invariance Technique, ESPRIT. On the basis of CSI and/or AoA, demodulation and decoding scheme estimations, as well as direction finding estimations may be performed.

Other known solutions use machine learning algorithms for estimating parameters of a wireless communication channel.

It has been found that there are situations in which estimations, e.g. AoA estimations, generated by signal processing algorithms deviate from the true parameter, e.g. true angle. Machine learning methods are usually based on neural networks, which need to be trained to a certain environment offline and beforehand. It is consequently cumbersome to develop a machine learning model, which is trained for all environments.

One object can therefore be seen in defining a method for providing at least one estimated parameter of a wireless communication channel and a radio receiver which enhance the estimation.

The objective is achieved by the subject-matter of the independent claims. Embodiments and developments are defined in the dependent claims.

The definitions provided above also apply to the following description unless stated otherwise.

SUMMARY

In one embodiment a method for providing at least one estimated parameter of a wireless communication channel comprises the following steps:

receiving at least one sample of raw data via the processing the at least one sample using a machine learning inference algorithm and therefrom providing a first estimated value, processing the at least one sample using a signal processing algorithm and therefrom providing a second estimated value, acquiring a first confidence value for the first estimated value, acquiring a second confidence value for the second estimated value, evaluating the first confidence value and the second confidence value, and providing either the first estimated value or the second estimated value or a combination of the first and the second estimated value as the at least one estimated parameter based on the evaluation.

By means of the proposed method, the at least one estimated parameter of the wireless communication channel is provided using a combination of or a selection from the estimated values provided by the signal processing algorithm and the machine learning inference algorithm, respectively. Said selection or combination is based on the first and the second confidence value, such that the best possible estimated value from the first and the second estimated values or a combination thereof is provided as the estimated parameter of the wireless communication channel. Thereby, the method enhances the estimation of the at least one parameter of the wireless communication channel.

The wireless communication channel typically refers to a certain number of frequencies, also called a frequency band, which are used for transmission of RF signals. Different wireless communication channels are standardized by respective organizations, like the International Telecommunication Union, ITU, or IEEE defining the standards used for mobile communication or wireless and short-range communication. The wireless communication channel may also be referred to just as a wireless channel.

Each of the first and the second confidence values indicates or reflects the quality of the first or the second estimated value, respectively. In more detail, the first confidence value which is acquired for and accorded to the first estimated value is a measure for the quality of the estimation of the first estimated value. This first estimated value is the output of the machine learning inference algorithm or method which processed the at least one sample of raw data. The second confidence value indicates how good the estimation of the second estimated value is. The second estimated value has been provided by the signal processing algorithm which processed the at least one sample of raw data. On the basis of this qualitative assessment of the estimated results of the signal processing algorithm and the machine learning inference algorithm for each sample of raw data it can be decided which of these algorithms provided the better result and the best result is provided as the final estimation of the estimated parameter of the wireless communication channel. In some cases, even a combination of the first and the second estimated value is provided as the estimated parameter.

Therein, the steps of the method as described above have not necessarily to be concluded in the order presented above. Rather, the step of processing the at least one sample using the signal processing algorithm and therefrom providing the second estimated value may as well be performed before the step of processing the at least one sample using a machine learning inference algorithm and therefrom providing the first estimated value. Both steps may even be executed concurrently. Similarly, the step of acquiring the second confidence value for the second estimated value may be performed before the step of acquiring the first confidence value for the first estimated value, or both steps may be performed concurrently.

According to an aspect the at least one sample comprises an in-phase value I and a quadrature value Q, making up an I/Q-sample.

Therein one I/Q-sample represents the amplitude and phase information conveyed by an RF signal at one time instant as known to those skilled in the art.

According to an aspect, the at least one estimated parameter comprises at least one of the following: channel state information, CSI, angle-of-arrival, AoA and distance.

The at least one estimated parameter depends on the application or the use case in which the proposed method is employed. For example, in the application of position location, for instance in Bluetooth direction finding by using Bluetooth Low Energy, BLE, the estimated parameter may be the AoA or the estimated distance between a mobile device, e.g. a tag and a stationary device, e.g. an anchor point.

In another use case an estimation for CSI is output by the method in the form of the at least one estimated parameter. Said CSI may be used by a modem in a receiver of a wireless communication device, for example to construct a model of the wireless communication channel for proper demodulation and decoding of the received data.

In a development the first confidence value represents a measure of quality of the first estimated value and the second confidence value represents a measure of quality of the second estimated value. Therein, a higher value of the confidence value in each case signifies a higher quality of the respective estimated value provided by the respective algorithm which processed the at least one sample.

Depending on the field of application or use case, more than one sample shall be processed. For example, in the case of position location in a receiver with two different antenna elements, one sample for each antenna element is provided in order to derive an AoA therefrom. As required by the proposed method, for each sample of raw data it is decided whether the estimated value output provided by the machine learning algorithm or the estimated value output provided by the signal processing algorithm is used as final estimation for the estimated parameter.

In a development the first confidence value depends on a condition of the wireless communication channel and the machine learning inference algorithm used for processing the at least one sample. The second confidence value depends on the condition of the wireless communication channel and the signal processing algorithm used for processing the at least one sample.

As already described above and known to those skilled in the art, signal processing algorithms are best suited for good channel conditions, while machine learning inference algorithms may be trained to certain environments or channel conditions. Therefore, the first confidence value is a function of the machine learning inference algorithm used and the condition of the communication channel. Likewise, various signal processing algorithms are available at present, each of which is adapted more or less to one specific use case. Thus, the quality of the second estimated value provided by said signal processing algorithm depends on the algorithm that is employed in the method and the channel condition.

In a development the condition of the wireless communication channel is defined by parameters comprising at least one of multipath propagation, line of sight, noise, interference or floor plan information.

Thus, the condition of the wireless communication channel reflects whether the RF signals passing said channel and forming the basis for each sample of raw data are subject to multipath propagation, or have a line of sight connection and how much noise and interference are actually present in the wireless communication channel. Especially in in-house applications, floor plan information may reflect the condition of the wireless communication channel. In the acquisition of the first and the second confidence values, the parameters listed above characterizing the communication channel are taken into account in combination with the machine learning or signal processing algorithm employed for generating the first and the second estimated value, respectively.

As known to those skilled in the art, signal processing algorithms are particularly suited for so-called good wireless channel or radio channel conditions, which are basically characterized by a line of sight, LoS, between transmitter and receiver. However, in difficult channel conditions, for example, in environments with multipath RF signal propagation, estimated AoA values deviate from the true AoA. Machine learning algorithms can improve estimations of channel parameters in situations or at locations where traditional signal processing methods and algorithms lack performance and robustness, for example, in multipath prone environments. By means of the proposed method, the second estimated value provided by the signal processing algorithm is provided as the estimated parameter when the wireless communication channel is good, whereas the first estimated value provided by the machine learning inference algorithm is provided as the estimated parameter in non-line-of-sight, NLoS, channel conditions, to which the machine learning inference algorithm may have been trained. Consequently, for most environments the estimation of the parameter is improved.

As further known to those skilled in the art, in NLoS environments, due to multipath propagation, an RF signal arrives at different angles and with larger delay at a receiving device. In a positioning application this results in a positioning error. To overcome the poor localization accuracy of known approaches, for example in the case of multipath and an obstructed or weak LoS RF signal, the proposed method enables more accurate and robust localization by taking into account the radio channel condition in combination with the algorithm used for estimating a value in the process of finally providing the estimated parameter.

For determining the channel condition, features such as a maximum received power, a root mean square delay spread, a Rician-K factor or an angular spread of departure/arrival may be measured, for example. A channel with a NLoS condition typically has lower maximum received power over the power delay profile due to the presence of obstructions and reflectors. The delay spread of multipath components is higher in NLoS environments. In NLoS channels, the K-factor is close to 0 dB. The angular spread of NLoS channels is wider since the multipath components arrive from varied directions.

A NLoS channel condition indicates a low value for the first or second confidence value, whereas in the opposite case, a LoS channel condition indicates a high value for the first or second confidence value.

In an exemplary implementation the first and/or second confidence value may be acquired in one of the following ways:

Computing a variance of the received I/Q samples, and determining a low confidence value in case the variance is high;

Comparing a received signal strength indicator, RSSI, value with a predefined threshold, and determining a high confidence value in case the RSSI value is a high value.

In a development the steps of evaluating the first confidence value and the second confidence value and providing either the first estimated value or the second estimated value or a combination of the first and the second estimated value as the at least one estimated parameter based on the evaluation comprises one of the following: comparing the first confidence value with the second confidence value and choosing from the first and the second estimated value the one which has the higher confidence value and providing it as the at least one estimated parameter, or comparing the first confidence value with a first pre-defined confidence value threshold, comparing the second confidence value with a second pre-defined confidence value threshold, calculating a difference between the first confidence value and the first confidence value threshold, calculating a difference between the second confidence value and the second confidence value threshold, and choosing from the first and the second estimated value the one whose confidence value has the smallest difference to the respective threshold and providing said estimated value as the at least one estimated parameter, or comparing the first confidence value with the second confidence value and adding the first estimated value weighted by the first confidence value and the second estimated value weighted by the second confidence value to a sum which is provided as the at least one estimated parameter.

The decision which leads to provision of the first or the second estimated value, or a combination of both as the estimated parameter, is based on a direct comparison of the first and the second confidence value or a comparison of the first and the second confidence value with the respective confidence value threshold, respectively. In other cases, for example when first and second confidence values are nearly equal, the first and the second estimated values are combined using a confidence value weighted sum. Thereby, both estimated values, i.e. the first and the second estimated value, contribute to the finally provided estimated parameter according to their respective weights, each weight being represented by the respective confidence value.

According to an example, first and second confidence values indicate that the wireless communication channel suffers from multipath propagation, because the first confidence value is higher than the second confidence value. Consequently, the output of the machine learning inference algorithm in the form of the first estimated value is selected to be provided as the at least one estimated parameter.

In another example, the first confidence value is lower than the second confidence value, for instance in environments to which the machine learning inference algorithm has not been trained beforehand. This may be noticed in the condition of the wireless communication channel, for example by evaluating one or more of the above-defined parameters, for instance the RSSI or a spatial power spectrum. If a deviation of the actual condition of the wireless communication channel from the condition of the wireless communication channel used during training the machine learning inference algorithm is detected, the acquired first confidence value is low. This leads to selection of the second estimated parameter provided by the signal processing algorithm as the at least one estimated parameter.

In a development the signal processing algorithm is realized as one of MUSIC, PDDA or ESPRIT. The machine learning inference algorithm is realized as one of deep learning, k nearest neighbors, Support Vector Machine or random forest regression.

The machine learning inference algorithm may also be called a machine learning method and refers to a trained machine learning algorithm which processes the I/Q samples. In an example, the machine learning inference algorithm is trained beforehand by inputting samples of raw data as training data. For these training samples of raw data the output of the machine learning algorithm is known. The machine learning algorithm is trained to provide approximately the known output as estimated values for these training samples. The model devised in this way beforehand is used as the machine learning inference algorithm in the proposed method. In the example use case of positioning, for each I/Q-sample the true AoA is known. The machine learning algorithm is trained to provide the true AoA as estimated value for each training I/Q-sample. In another use case of positioning, for each I/Q-sample the true distance is known and the machine learning algorithm is trained to provide the true distance as estimated value for each training I/Q-sample.

In a development the method further comprises the step of comparing the first confidence value with the second confidence value and deactivating for an adjustable amount of time the algorithm which provided the estimated value for which a lower confidence value was acquired. Alternatively, the method further comprises the step of comparing the first confidence value with a first pre-defined confidence value threshold, comparing the second confidence value with a second pre-defined confidence value threshold, calculating a difference between the first confidence value and the first confidence value threshold, calculating a difference between the second confidence value and the second confidence value threshold, and based on the calculated differences deactivating either the machine learning inference algorithm or the signal processing algorithm for the adjustable amount of time.

Based on the evaluation of the first and the second confidence value, either the machine learning inference algorithm or the signal processing algorithm may be disabled for an adjustable amount of time. This saves computing power.

For example, in multipath propagation prone environments in which performance of the machine learning inference algorithm is superior to performance of the signal processing algorithm in terms of quality of the estimated values, the signal processing algorithm may be turned off.

In one embodiment a radio receiver device comprises processing means for carrying out the method as defined in any of the embodiments described above.

The radio receiver device or radio receiver in short consequently takes advantage of its ability to select or combine estimated values provided by the signal processing algorithm and the machine learning inference algorithm, respectively, for providing the at least one estimated parameter of the wireless communication channel. As the decision on which of the first or the second estimated values as provided shall be taken on the basis of the first and the second confidence value accorded respectively to the first and second estimated value, the at least one estimated parameter is provided with enhanced precision.

In a development the radio receiver device is further configured to receive and process radio frequency, RF, signals, in particular RF signals according to a short-range communication technology, for example Bluetooth, ZigBee, ultra-wideband, UWB, or Wireless Local Area Network, WLAN, according to IEEE 802.11x. The radio receiver device is further configured to receive and process RF signals according to a mobile communication standard, for example defined by the third generation partnership program 3GPP, e.g. 3G, 4G, 5G and beyond 5G.

The method defined above may be employed in any radio receiver for wireless communication or short-range communication in order to provide estimations of parameters of the wireless communication channel with enhanced precision. Said radio receiver may be deployed in a base station thereby forming part of a mobile communication network according to the 3GPP. The radio receiver may also be realized within an anchor point as counterpart to a tag in a Bluetooth, especially Bluetooth Low Energy, short range network infrastructure. Furthermore, the radio receiver may be implemented in an access point of a WLAN.

In one embodiment a computer program product comprises instructions to cause the radio receiver as defined above to execute the method as defined above.

In one embodiment a computer readable medium has the computer program product defined above stored thereon.

BRIEF DESCRIPTION OF THE DRAWINGS

The text below explains the proposed solution in detail using exemplary embodiments with reference to the drawings. Components and elements that are functionally identical or have an identical effect bear identical reference numbers. Insofar as parts or components correspond to one another in their function, a description of them will not be repeated in each of the following figures. Therein.

DETAILED DESCRIPTION

Figure 1:
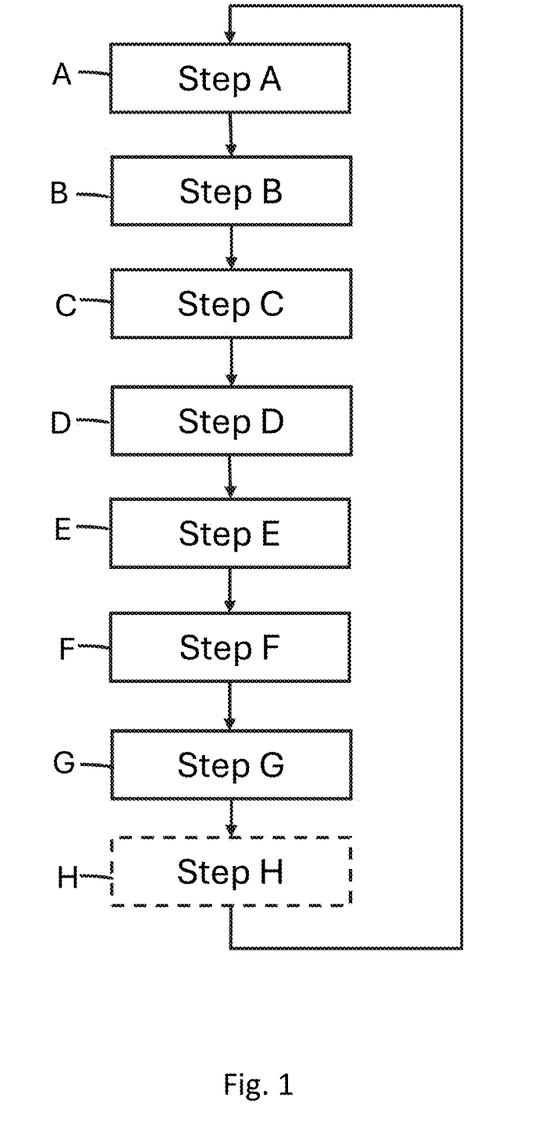
FIG. 1 shows an exemplary embodiment of a method as proposed.

FIG. 1 shows an exemplary embodiment of a method as proposed. The method for providing at least one estimated parameter of a wireless communication channel comprises the steps of:

A: receiving at least one sample of raw data via the

B: processing the at least one sample using a machine learning inference algorithm and therefrom providing a first estimated value, C: processing the at least one sample using a signal processing algorithm and therefrom providing a second estimated value, D: acquiring a first confidence value for the first estimated value, E: acquiring a second confidence value for the second estimated value, F: evaluating the first confidence value and the second confidence value, and G: providing either the first estimated value or the second estimated value or a combination of the first and the second estimated value as the at least one estimated parameter based on the evaluation.

The method can be performed continuously as indicated in the drawing. For this, the method may start over again with step A by receiving the next sample of raw data.

By means of the proposed method, a confidence/quality based switching and/or combination of the outputs of the machine learning inference algorithm and the signal processing algorithm in the provisioning of the estimated parameter of the wireless communication channel is enabled. Said confidence/quality based switching and/or combination relies on the evaluation of the first and the second confidence value, each of which reflects the quality of the estimation performed by the machine learning inference algorithm and the signal processing algorithm, respectively, in processing the samples of raw data. By this, the estimation of the at least one estimated parameter provided by the method is enhanced, i.e. the value of the estimated parameter resulting from the method is close to or coincides with the real value.

It should be noted that the sequence of steps A to G shown in FIG. 1 is not the only possible realization of the proposed method. Depending on the implementation, step C may be performed before step B or steps B and C may be performed concurrently. Similarly, step E may be performed before step D or steps D and E may be performed concurrently.

The first confidence value reflects a quality of the first estimated value. In case the first estimated value lies close to or coincides with a real or true value for the processed sample of raw data, a higher first confidence value is acquired, signifying higher quality of the estimation performed by the machine learning inference algorithm. In analogy, the closer the second estimated value lies to the true value, the higher the acquired second confidence value will be.

The first confidence value is a function of a condition of the wireless communication channel and also depends on the machine learning inference algorithm used to provide the first estimated value. For example, the condition of the communication channel may be a non-line-of-sight condition and the machine learning inference algorithm may be realized as a support vector machine. The second confidence value is a function of the condition of the wireless communication channel and the employed signal processing algorithm which provided the second estimated value. For example, the condition of the wireless communication channel may be a line of sight condition and the signal processing algorithm used may be PDDA.

The proposed method enables selection of the best estimated value out of the first and the second estimated values in the provision of the final estimation of the estimated parameter for each sample of raw data, such that for each sample the best estimation is provided, taking into account the channel condition amongst others. The method also provides the possibility of combining the estimations of both categories of algorithms employed, namely the machine learning algorithm and the signal processing algorithm, for enhancing the final estimation of the estimated parameter.

Optionally, the method also comprises the step H, in which the first confidence value is compared with the second confidence value and the algorithm (either the machine learning inference or the signal processing algorithm) which provided the estimated value for which a lower confidence value was acquired is deactivated. Alternatively, the step H comprises comparing the first confidence value with a first predefined confidence value threshold, comparing the second confidence value with a second predefined confidence value threshold, calculating a difference between the first confidence value and the first confidence value threshold, calculating a difference between the second confidence value and the second confidence value threshold, and based on the calculated differences, deactivating either the machine learning inference algorithm or the signal processing algorithm for an adjustable amount of time.

Therein, the amount of time during which one of the algorithms is deactivated is adjusted beforehand, for example based on a number of samples of raw data processed, or a timespan.

The first and second confidence value thresholds are defined beforehand empirically and/or taking into account the application, e.g. AoA or CSI.

In the case that it turns out that, based on the evaluation of the first and the second confidence value, one of the algorithms produced an estimated value for which a confidence value reflecting low quality of the estimation was acquired, said algorithm may be deactivated. This may occur for signal processing algorithms, like PDDA, in non-line-of-sight channel conditions. This may equally occur for machine learning inference algorithms, like the k nearest neighbour algorithm in channel conditions, to which these algorithms have not been trained beforehand. By turning off one of the algorithms, computing power is saved.

Figure 2:
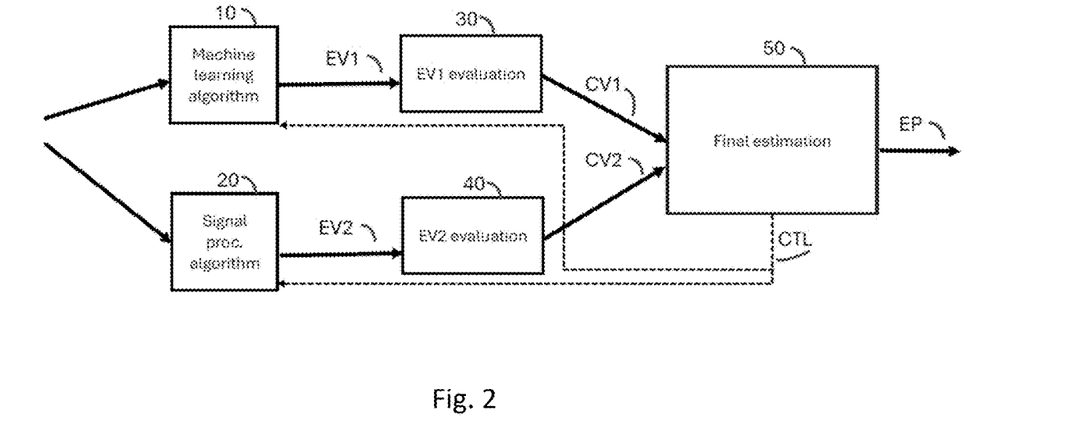
FIG. 2 shows an exemplary functional block diagram of the method as proposed.

FIG. 2 shows a functional block diagram for the method as proposed. In the following reference is made to the steps of the method shown in FIG. 1.

A sample S of raw data is received in step A. Said sample S is processed in the machine learning inference algorithm 10 which consequently provides the first estimated value EV1, as explained above in step B. The same sample S of raw data is processed concurrently by the signal processing algorithm 20, which therefrom provides the second estimated value EV2, as explained above in step C. In block 30 the confidence of the first estimated value EV1 is evaluated or determined and correspondingly the first confidence value CV1 is provided, as explained above in step D. Concurrently in block 40 the confidence of the second estimated value EV2 is evaluated or determined and the second confidence value CV2 is provided accordingly as explained above in step E. A final estimation block 50 performs steps F and G, described above, i.e., it evaluates the first and the second confidence value CV1, CV2 and, based on this evaluation, provides either the first estimated value EV1 or the second estimated value EV2 or a combination of the first and the second estimated value EV1, EV2 as the at least one estimated parameter EP as an output of the method.

Optionally, the final estimation block 50 may also initiate disabling the machine learning inference algorithm 10 or the signal processing algorithm 20 by means of a control signal CTL based on the evaluation of the first and the second confidence value CV1, CV2, as detailed above with reference to step H.

Figure 3:
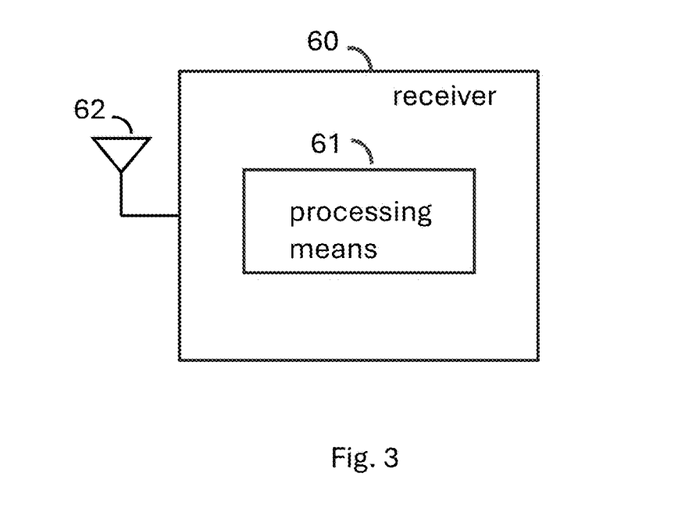
FIG. 3 shows an exemplary embodiment of a radio receiver device as proposed.

FIG. 3 shows an embodiment example of a radio receiver device 60. The radio receiver device 60 comprises processing means 61 for carrying out the method as described above, e.g., the method of FIG. 1. The processing means 61 may be realized in the form of a microprocessor and suitable storage. Optionally, the radio receiver device 60 is further configured to receive and process RF signals, for example RF signals according to Bluetooth Low Energy, BLE, or wireless LAN and/or RF signals used in mobile communication according to standards defined by the 3GPP. For this purpose the radio receiver device 60 has at least one antenna 62 and suitable radio receiver circuitry (not shown in FIG. 3) as known to those skilled in the art. The at least one antenna 62 may have a plurality of antenna elements.

The radio receiver device 60 may be used in an anchor point defined in a Bluetooth, especially BLE, infrastructure. The radio receiver device 60 may also be deployed in a base station or a node B in a 3GPP communication network.

Figure 4:
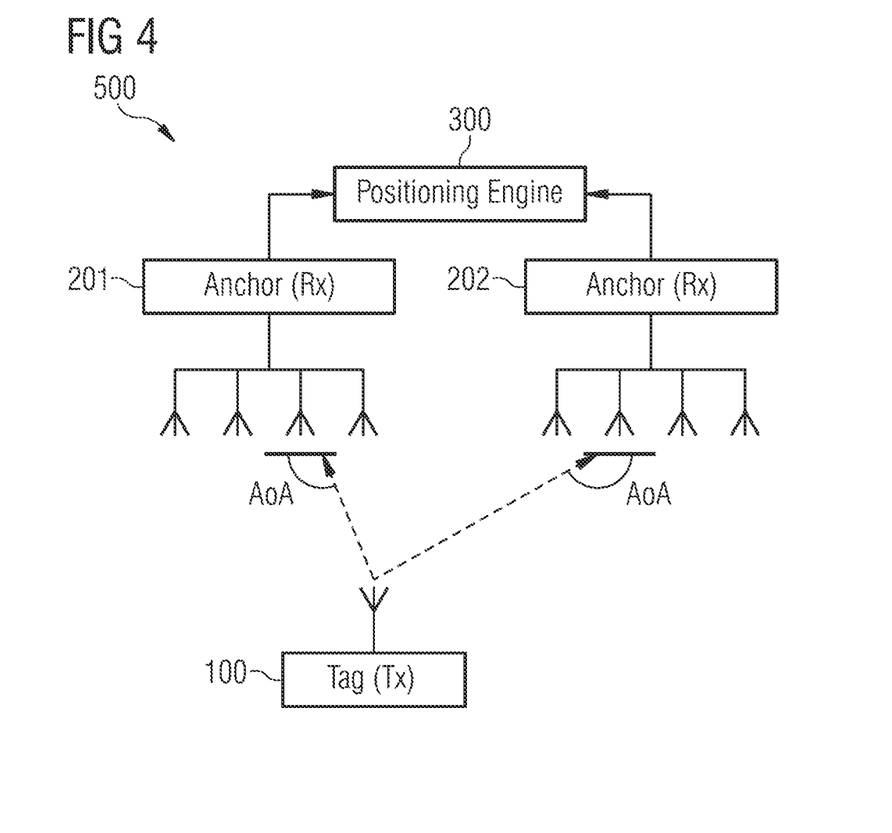
FIG. 4 shows an exemplary application scenario of the method and receiver as proposed.

FIG. 4 shows an exemplary application scenario 500 or use case for the proposed method and radio receiver device. The application scenario 500 is position location. In the depicted example a Bluetooth or BLE infrastructure, for example corresponding to BLE 5.1 or higher is employed together with the proposed method and radio receiver for estimating a position of tag 100.

A first and a second anchor point 201, 202 are shown which both have a connection to a positioning engine 300. Tag 100 sends BLE 5.1 direction finding packets which are received by the first and the second anchor point 201, 202. Each of these anchor points 201, 202 performs an angle of arrival, AoA, estimation. Each AoA estimation is provided to the positioning engine 300 which determines the position of the tag 100.

In the depicted application scenario 500 the proposed method is used to provide AoA estimation values as estimated parameters from the direction finding packets received by each antenna array of first and second anchor point 201, 202. From these direction finding packets samples of raw data, for example in the form of I/Q samples, are extracted and used as input to the proposed method. Each anchor point 201, 202 comprises the proposed radio receiver device as shown in FIG. 3, for example.

In an alternative realization, the proposed method is performed by the positioning engine 300, which then incorporates the proposed radio receiving device, e.g. as depicted in FIG. 3. In this alternative, each anchor point 201, 202, passes I/Q-samples extracted from direction finding packets received from tag 100 to the positioning engine 300. For each of the received I/Q-samples the positioning engine 300 performs the steps of the proposed method.

In the depicted example use case 500, the position of tag 100 is estimated with high accuracy.

Figure 5:
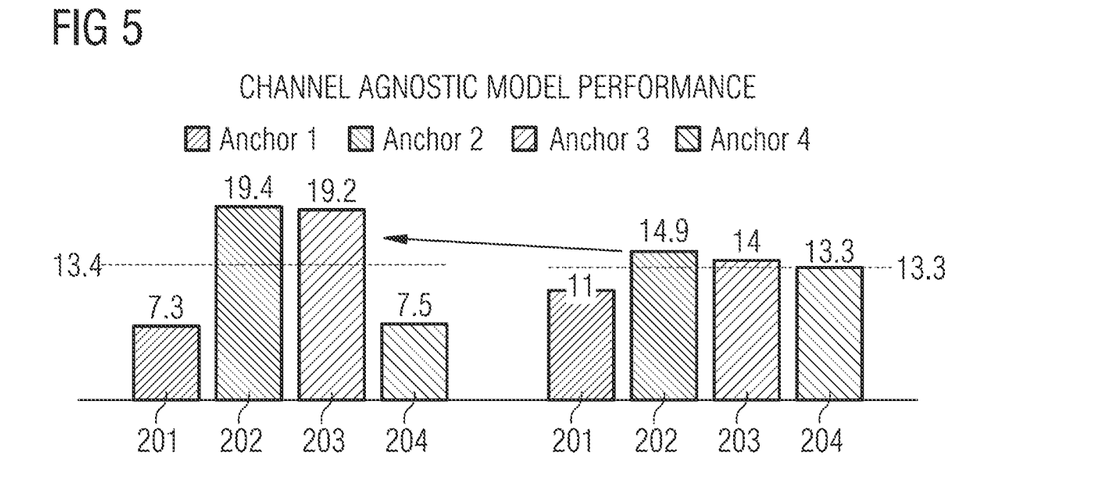
FIG. 5 shows exemplary measurement results.

FIG. 5 shows exemplary measurement results. A scenario similar to the one depicted in FIG. 4 was used. Estimation results for AoA estimations provided by a signal processing algorithm on the left side and a machine learning algorithm on the right side are compared. Therein, PDDA has been used as signal processing algorithm. In each case, the angle error in degrees is depicted for four different anchor points 201, 202, 203, 204.

It can be discerned that anchor point 201 and 204 provide better AoA estimations with the signal processing algorithm PDDA, while the anchor points 202 and 203 provide better AoA estimations with the machine learning inference algorithm. The solution proposed herein ensures that the best estimation is provided as the final estimation.

It will be appreciated that the invention is not limited to the disclosed embodiments and to what has been particularly shown and described hereinabove. Rather, features recited in separate dependent claims or in the description may advantageously be combined. Furthermore, the scope of the invention includes those variations and modifications which will be apparent to those skilled in the art and fall within the scope of the appended claims. The term "comprising" used in the claims or in the description does not exclude other elements or steps of a corresponding feature or procedure. In the case that the terms "a" or "an" are used in conjunction with features, they do not exclude a plurality of such features. Moreover, any reference signs in the claims should not be construed as limiting the scope.

REFERENCE LIST

A, B, C, D, E, F, G, H step
20, 30, 40, 50 Block
S sample
EV1, EV2 estimated value
CV1, CV2 confidence value
EP estimated parameter
CTL control signal
60 radio receiver device
61 processing means
62 one or more antennas
100 tag
201, 202, 203, 204 anchor point
300 positioning engine
500 application scenario

The invention claimed is:

1. A method for providing at least one estimated parameter of a wireless communication channel, the method comprising:
receiving at least one sample of raw data via the wireless communication channel,
processing the at least one sample using a machine learning inference algorithm and therefrom providing a first estimated value,
processing the at least one sample using a signal processing algorithm and therefrom providing a second estimated value,
acquiring a first confidence value for the first estimated value,
acquiring a second confidence value for the second estimated value,
evaluating the first confidence value and the second confidence value, and
providing either the first estimated value or the second estimated value or a combination of the first and the second estimated value as the at least one estimated parameter based on the evaluation.

2. The method according to claim 1, wherein the at least one sample comprises an in-phase value (I) and a quadrature value (Q) making up an I/Q-sample.

3. The method according to claim 1,
wherein the first confidence value represents a measure of a quality of the first estimated value and the second confidence value represents a measure of a quality of the second estimated value, and
wherein a higher value of the confidence value in each case signifies a higher quality of the respective estimated value provided by the respective algorithm which processed the at least one sample.

4. The method according to claim 1,
wherein the first confidence value depends on a condition of the wireless communication channel and the machine learning inference algorithm used for processing the at least one sample, and
wherein the second confidence value depends on the condition of the wireless communication channel and the signal processing algorithm used for processing the at least one sample.

5. The method according to claim 4, wherein the condition of the wireless communication channel is defined by parameters comprising at least one of multipath propagation, line of sight, noise, interference, or floor plan information.

6. The method according to claim 1,
wherein evaluating the first confidence value and the second confidence value and providing either the first estimated value or the second estimated value or a combination of the first and the second estimated value as the at least one estimated parameter based on the evaluation comprises one of the following:
comparing the first confidence value with the second confidence value and choosing from the first and the second estimated value the one which has the higher confidence value and providing it as the at least one estimated parameter, or
comparing the first confidence value with a first pre-defined confidence value threshold, comparing the second confidence value with a second pre-defined confidence value threshold, calculating a difference between the first confidence value and the first confidence value threshold, calculating a difference between the second confidence value and the second confidence value threshold, and choosing from the first and the second estimated value the one whose confidence value has the smallest difference to the respective threshold and providing it as the at least one estimated parameter, or
comparing the first confidence value with the second confidence value and adding the first estimated value weighted by the first confidence value and the second estimated value weighted by the second confidence value to a sum which is provided as the at least one estimated parameter.

7. The method according to claim 1, wherein the at least one estimated parameter comprises at least one of channel state information or an angle-of-arrival, or a distance.

8. The method according to claim 1,
wherein the signal processing algorithm is realized as one of Multiple Signal classification, Propagator Direct Data Acquisition, or Estimation of Signal Parameters via Rotational Invariance Technique, and
wherein the machine learning inference algorithm is realized as one of deep learning, k nearest neighbour algorithm, Support Vector Machine, or random forest regression.

9. The method according to claim 1,
further comprising comparing the first confidence value with the second confidence value and deactivating for an adjustable amount of time the algorithm which provided the estimated value for which a lower confidence value was acquired, or
further comprising comparing the first confidence value with a first pre-defined confidence value threshold, comparing the second confidence value with a second pre-defined confidence value threshold, calculating a difference between the first confidence value and the first confidence value threshold, calculating a difference between the second confidence value and the second confidence value threshold, and based on the calculated differences deactivating either the machine learning inference algorithm or the signal processing algorithm for the adjustable amount of time.

10. A radio receiver device comprising:
an antenna;
radio receiver circuitry configured to receive at least one sample of raw data via a wireless communication channel; and
a processor coupled to the radio receiver circuitry, wherein the processor is configured to:
process the at least one sample using a machine learning inference algorithm and therefrom providing a first estimated value, process the at least one sample using a signal processing algorithm and therefrom providing a second estimated value,
acquire a first confidence value for the first estimated value,
acquire a second confidence value for the second estimated value,
evaluate the first confidence value and the second confidence value, and
provide either the first estimated value or the second estimated value or a combination of the first and the second estimated value as the at least one estimated parameter based on the evaluation.

11. The radio receiver device of claim 10, wherein the radio receiver device is further configured to receive and process radio frequency signals, according to a short range communication technology and RF signals according to a wireless communication standard defined by third generation partnership program.

12. One or more tangible, non-transitory, computer-readable media storing instructions that, when executed by a radio receiver device configured to receive at least one sample of raw data via a wireless communication channel, cause the radio receiver device to perform operations comprising:
processing the at least one sample using a machine learning inference algorithm and therefrom providing a first estimated value,
processing the at least one sample using a signal processing algorithm and therefrom providing a second estimated value,
acquiring a first confidence value for the first estimated value,
acquiring a second confidence value for the second estimated value,
evaluating the first confidence value and the second confidence value, and
providing either the first estimated value or the second estimated value or a combination of the first and the second estimated value as the at least one estimated parameter based on the evaluation.

* * * * *